United States Patent [19]
Webber

[11] 3,905,963

[45] Sept. 16, 1975

[54] PROCESS FOR PREPARING PRIMARY 3-CARBAMOYLOXYMETHYL CEPHALOSPORINS

[75] Inventor: J. Alan Webber, Indianapolis, Ind.

[73] Assignee: Eli Lilly and Company, Indianapolis, Ind.

[22] Filed: Jan. 25, 1972

[21] Appl. No.: 220,697

[52] U.S. Cl. .............................. 260/243 C; 424/246
[51] Int. Cl.² ...................................... C07D 501/20
[58] Field of Search .............................. 260/243 C

[56] References Cited
UNITED STATES PATENTS

| | | | |
|---|---|---|---|
| 3,355,452 | 11/1967 | Urech et al. | 260/243 C |
| 3,484,437 | 12/1969 | Urech et al. | 260/243 C |
| 3,632,578 | 1/1972 | Chauvette | 260/242 C |
| 3,632,810 | 1/1972 | Bickel et al. | 260/243 C |
| 3,706,746 | 12/1972 | Bosshardt et al. | 260/243 C |

OTHER PUBLICATIONS

Fieser et al., Reagents for Organic Synthesis, pages 117 & 1219, (1967).

Hedin et al., Analytical Chemistry, Vol. 42, No. 3, pages 404–407, (March, 1970).

Mertheim, Textbook of Organic Chemistry, page 290, (1945), Second Edition.

Primary Examiner—Nicholas S. Rizzo
Attorney, Agent, or Firm—William C. Martens, Jr.; Everet F. Smith

[57] ABSTRACT

Primary 3-carbamoyloxymethyl cephalosporins are prepared from corresponding 3-hydroxymethyl cephalosporins by their reaction with an appropriate isocyanate followed by selective cleavage of the resulting N-substituted 3-carbamoyloxymethyl cephalosporin.

7 Claims, No Drawings

PROCESS FOR PREPARING PRIMARY 3-CARBAMOYLOXYMETHYL CEPHALOSPORINS

BACKGROUND OF THE INVENTION

Cephalosporins having a primary carbamoyloxymethyl substituent in the 3-position are recognized in the art. U.S. application Ser. No. 849,395, filed Aug. 12, 1969, now abandoned, and replaced by copending application Ser. No. 62,390, filed Aug. 10, 1970, defines the following compounds:

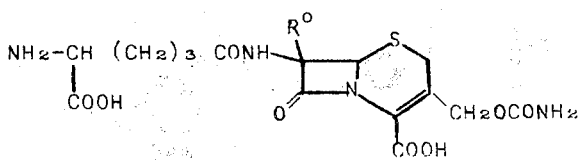

in which $R^o$ is hydrogen or methoxy. These compounds are obtained by fermentation of *Streptomyces clavuligerus* NRRL 3585. In the instance in which $R^o$ is a methoxyl group, the compound is alternatively identified as antibiotic "A16886I". In the instance in which $R^o$ is hydrogen, the compound is alternatively identified as antibiotic "A16886II".

Derivatives of the above two compounds are likewise found in the prior art. In all such derivatives, the primary carbamoyloxymethyl substituent in the 3-position is retained while various substituents are incorporated into the 4- and/or 7-positions. Copending application Ser. No. 139,915, filed May 3, 1971, is directed to such derivatives of antibiotic A16886I. Copending application Ser. No. 139,913, filed May 3, 1971, is directed to such derivatives of antibiotic A16886II.

In all previous instances, the existence of cephalosporin compounds having a primary carbamoyloxymethyl substituent in the 3-position has arisen by way of the fermentation products of *Streptomyces clavuligerus* NRRL 3585, and by conversion of such fermentation products to other 7- and/or 4-substituted derivatives. Belgian Patent No. 741,381 describes a class of cephalosporin compounds bearing in the 3-position, inter alia, a primary carbamoyloxymethyl substituent. However, this patent expressly teaches and exemplifies only *substituted* carbamoyloxymethyl substituents; this patent does not teach a method which is useful for obtaining a cephalosporin having a primary carbamoyloxymethyl substituent in the 3-position.

SUMMARY OF THE INVENTION

This invention is directed to a process for preparing cephalosporin compounds having a primary carbamoyloxymethyl substituent in the 3-position from other readily available cephalosporin compounds.

In its broad embodiment, this invention is directed to a process for preparing a compound having the formula

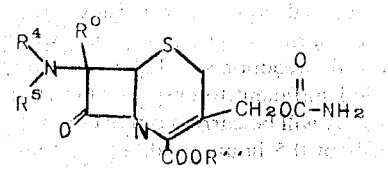

which comprises the sequence of reacting a compound of the formula

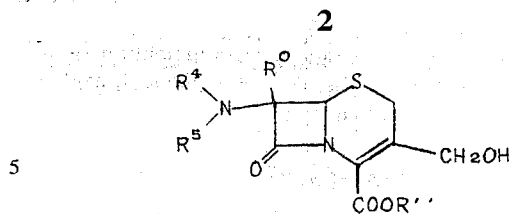

with an N-substituted isocyanate to produce a corresponding 3-(N-substituted)carbamoyloxymethyl derivative, and cleaving the N-substituent in the presence of silica gel, an aqueous buffer solution having a pH of from about 5 to about 9, an alkali or alkaline earth metal carbonate, bicarbonate, or sulfite, or zinc with a $C_1$–$C_4$ alcohol or an acid having a pK value greater than about 3 to produce the desired 3-carbamoyloxymethyl cephalosporin derivative, in which, in the foregoing formulae, $R^o$ is hydrogen or methoxy, $R^4$ and $R^5$ in combination or separately are an amino protecting group, and $R''$ is hydrogen, an amine salt cation, or a carboxy protecting group.

Detailed Description of the Invention

In the process of this invention the basic starting material has the following structure:

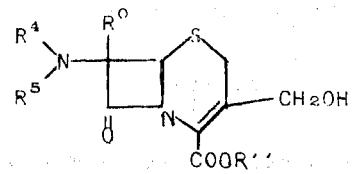

In the above formula, $R^o$, $R''$, $R^4$, and $R^5$ are as herein defined.

In the above formulae, the $R''$ substituent can be hydrogen, an amine salt cation, or a carboxy protecting group. Such groups and their use are now well recognized in the cephalosporin art and need no specific exemplification. Preferred carboxy protecting groups include, for example, $C_1$–$C_6$ alkyl, 2,2,2-trihaloethyl, 2-iodoethyl, $C_5$–$C_7$ tert-alkenyl, $C_5$–$C_7$ tert-alkynyl, benzyl, nitrobenzyl, tetrahydropyranyl, succinimidomethyl, phthalimidomethyl, methoxybenzyl, dimethoxybenzyl, cyanomethyl, nitrophenyl, dinitrophenyl, 2,4,6-trinitrophenyl, bis(p-methoxyphenyl)methyl, triphenylmethyl, benzhydryl, benzyloxymethyl, $C_2$–$C_6$ alkanoyloxymethyl, $C_2$–$C_4$ alkanoyl, phenacyl, a radical of the formula

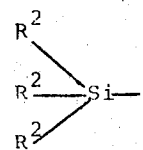

in which each $R^2$ independently is $C_1$–$C_4$ alkyl or halo selected from the group consisting of bromo, chloro, fluoro, and iodo, subject to the limitation that at least one $R^2$ is $C_1$–$C_4$ alkyl; or the like.

Preferred amines suitable for producing an amine salt cation include, for example, dicyclohexylamine, triethylamine, tributylamine, and the like.

In the above formulae, $R^4$ and $R^5$ denote an amino protecting group. Such groups and their use are now well recognized in the cephalosporin art and need no specific exemplification. Preferred amino protecting groups include, for example, the combination of $R^4$ being hydrogen and $R^5$ being $C_1$–$C_8$ alkanoyl; azidoacetyl; cyanoacetyl; haloacetyl;

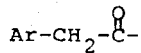

in which Ar is phenyl, thienyl, furyl, pyrrolyl, or phenyl substituted with from one to three substituents selected from the group consisting of fluorine, chlorine, bromine, iodine, trifluoromethyl, hydroxy, $C_1$–$C_3$ alkyl, $C_1$–$C_3$ alkoxy, cyano, and nitro;

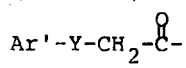

in which Ar' is phenyl, pyridyl, or substituted phenyl as defined above, and Y is oxygen or sulfur;

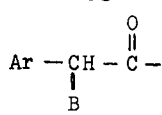

in which Ar is as defined above, and B is a hydroxyl or carboxy group protected by esterification; —CN; —$N_3$; or —NHR in which R is benzyloxycarbonyl, $C_1$–$C_4$ alkoxycarbonyl, cycloalkoxycarbonyl, triphenylmethyl,

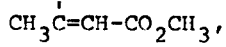

or 2,2,2-trichloroethoxycarbonyl; (3-sydnone)$C_2$–$C_3$ alkanoyl; 2-(1H-tetrazol-1-yl)acetyl;

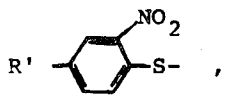

in which R' is hydrogen or methoxy;

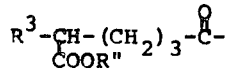

in which R'' is as herein defined, and $R^3$ is amino or an acylamido group in which the acyl group is $C_1$–$C_4$ alkanoyl, $C_6$–$C_{12}$ aroyl, $C_1$–$C_4$ alkoxycarbonyl, benzyloxycarbonyl, $C_5$–$C_6$ cycloalkoxycarbonyl, $C_6$–$C_{12}$ aryloxycarbonyl, phthaloyl, or one of the above groups substituted with from one to three groups, each selected from the group consisting of $C_1$–$C_4$ alkyl, halo, nitro, $C_1$–$C_4$ alkoxy, cyano, or the like. Additional preferred amino protecting groups are those defined by $R^4$ and $R^5$, taken together with the nitrogen to which they are bonded, and include, for example, phthalimido, a cyclic imide moiety of a $C_3$–$C_{12}$ dicarboxylic acid, or the like.

The moiety in the 3-position of the cephalosporin starting material employed in the process of this invention is a hydroxymethyl group.

The process of this invention comprises a two-step reaction sequence. The first step of the two-step sequence converts the 3-hydroxymethyl moiety to the moiety

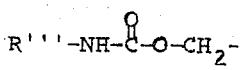

in which R''' is any group which forms a stable N-substituted carbamoyloxymethyl substituent and which is removable therefrom under mild conditions which produce a primary carbamoyloxymethyl substituent and which do not affect other portions of the molecule. Ideally suited for this purpose are substituted carbamoyloxymethyl substituents in which the R''' group is

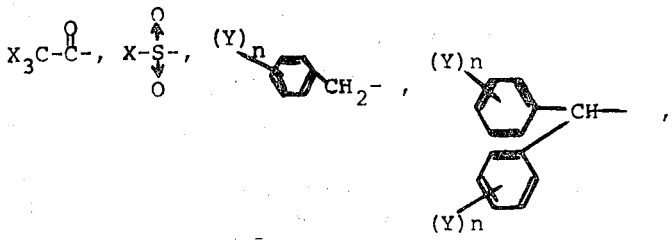

or $R^6$—O—$CH_2$— in which X is halogen, Y is hydrogen, halogen, $C_1$–$C_4$ alkoxy, $C_1$–$C_4$ alkyl or trifluoromethyl, n is an integer from 1 to 3, and $R^6$ is benzyl or $C_1$–$C_4$ alkyl.

As used herein, the terms "halogen" and "halo" both refer to any of fluorine, chlorine, bromine and iodine.

Highly preferred isocyanates include, for example, trichloroacetyl isocyanate, chlorosulfonyl isocyanate, benzyl isocyanate, p-methoxybenzyl isocyanate, methoxymethyl isocyanate, benzyloxymethyl isocyanate, benzhydryl isocyanate, and the like.

This convention is accomplished by reacting the 3-hydroxymethyl derivative with an isocyanate of the formula R'''-N=C=O. The reaction is equimolar and can be carried out using equivalent molar quantities of the starting materials. However, since the isocyanate is readily decomposed by the presence of water or alcohol, in order to accommodate any such decomposition, the reaction will generally be carried out in the presence of an excess of the isocyanate. Thus, usually from about 2 moles to about 8 moles of the isocyanate per mole of the 3-hydroxymethyl cephalosporin will be employed. The reaction generally is accomplished simply by mixing the 3-hydroxymethyl cephalasporin and the isocyanate in a suitable inert solvent or mixture of solvents and allowing the reaction to proceed generally at a temperature of from about −10°C. to about +30°C. By inert solvent is intended any solvent which will dissolve the isocyanate but which will not react with it, or with the cephalosporin reactant. Suitable inert solvents include, for example, dichloromethane; dimethylformamide, tetrahydrofuran, acetonitrile, and the like. However, a solvent is not essential, and the reaction can be carried out simply by employing an excess of the isocyanate.

The reaction of the isocyanate with the 3-hydroxymethyl cephalosporin is generally very rapid. The reaction ordinarily will be completed within 0.5 hours. However, the reaction should be allowed to proceed for a period sufficient to ensure completion, and therefore generally will be carried out over a period extending from about 0.5 hours to about 20 hours. The speed of the reaction is somewhat dependent upon the temperature at which it is carried out, and, therefore, a lower reaction temperature will generally require a longer reaction time.

The second step of the process of this invention accomplishes the cleavage of the R''' group from the previously produced

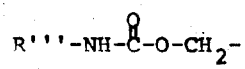

moiety to realize the desired

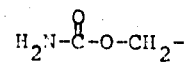

derivative. The R''' group may be any group which permits the formation of a stable N-substituted carbamoyloxymethyl moiety in the 3-position of the cephalosporin, and which is removable from the moiety to produce a primary carbamoyloxymethyl derivative by employing mild conditions which do not affect other portions of the molecule. As indicated hereinabove, it is highly preferred that the R''' group be

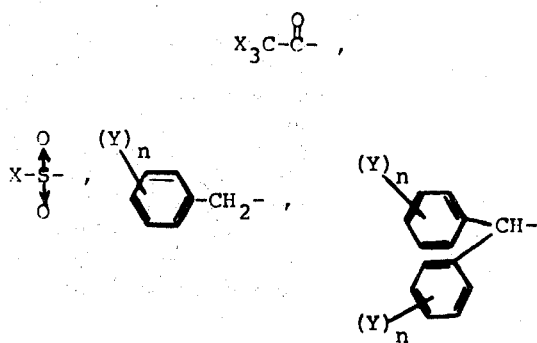

or R$^6$—O—CH$_2$—, in which X, Y, n and R$^6$ are as herein defined.

The mild conditions under which the cleavage of the R''' group is carried out include, for example, use of silica gel, use of an aqueous buffer solution having a pH of from about 5 to about 9, use of an alkali or an alkaline earth metal carbonate, bicarbonate, or sulfite, or use of zinc and a C$_1$–C$_4$ alcohol or an acid having a pK value greater than about 3, such as formic acid, acetic acid, trifluoroacetic acid, or the like.

Cleavage of the R''' substituent is desirably carried out at a temperature of from about 0°C. to about 40°C., and more preferably at about room temperature. The cleavage is effectively accomplished when the reaction is allowed to proceed for a period of from about 0.5 hours to about 8 hours, and generally will be completed in about 2 to 4 hours.

The cleavage is desirably carried out in the presence of a solvent or a mixture of solvents, such as water, alcohol, ether, tetrahydrofuran, dichloromethane, acetonitrile, dimethylformamide, and the like. It is highly preferred that the cleavage be carried out in the presence of water or a lower alcohol, such as methanol, ethanol, n-propanol, isopropanol, t-butyl alcohol, or the like.

When cleavage is effected in the presence of an aqueous buffer solution having a pH of from about 5 to about 9, the N-substituted carbamoyloxymethyl cephalosporin derivative generally is added to the appropriately buffered aqueous medium. Any suitable buffering agent which affords the desired pH can be employed, and several of such agents are well recognized by those skilled in the art. Suitable buffering agents include phosphates as well as several of those already mentioned herein as being in themselves useful to accomplish the desired cleavage. These include, for example, silica gel, and alkali or alkaline earth metal carbonates, bicarbonates, or sulfites.

When zinc in the presence of an alcohol or an acid is employed as the method of carrying out the cleavage, the N-substituted carbamoyloxymethyl cephalosporin derivative generally is added to the acid or alcohol which is to be employed or to a solvent containing such acid or alcohol, and the zinc is added to the resulting mixture. In order to assure completion of the cleavage reaction, the zinc will generally be employed in at least a molar equivalent and preferably in a molar excess of from about 2 to about 15 moles of the zinc per mole of the cephalosporin derivative. The amount of acid or alcohol which is employed is not critical to the cleavage reaction and need be present only in amounts sufficient to accomplish dissolution of the cephalosporin reactant.

In the instance in which the carbonate, bicarbonate, or sulfite is employed to accomplish cleavage of the N-substituted carbamoyloxymethyl cephalosporin derivative, it is necessary only to employ a minor amount (less than one equivalent based on the cephalosporin derivative) of the carbonate, bicarbonate, or sulfite. Generally, from about 5 to about 20 g. of the carbonate, bicarbonate, or sulfite per mole of the cephalosporin derivative will be employed. Although not preferred, it is also possible to employ mixtures of any of these reagents. Usually the cephalosporin derivative is added to an appropriate solvent medium, and the carbonate, bicarbonate or sulfite is added to the resulting mixture, and this reaction mixture is then maintained for a period necessary to complete the cleavage reaction. Typical reagents which can be employed include, for example, sodium carbonate, sodium bicarbonate, sodium sulfite, potassium carbonate, potassium bicarbonate, potassium sulfite, lithium carbonate, lithium bicarbonate, lithium sulfite, magnesium carbonate, magnesium sulfite, calcium carbonate, calcium sulfite, and the like.

In the instance in which silica gel is employed to accomplish the cleavage reaction, a very convenient method of accomplishing this cleavage is to dissolve the cephalosporin derivative in an appropriate solvent and to pass the resulting solution over a chromatographic column comprising the silica gel. Any of several commercially available silica gel can be employed to effect this cleavage, and the silica gel may or may not contain additional substances, including, for example, from 5 to 50 percent water.

In the instance in which the starting material is a 7-acylamido-3-hydroxymethyl-3-cephem-4-carboxylic acid or an ester thereof, the product will be the corresponding 3-carbamoyloxymethyl derivative. Analogously, if the starting material is a 7-acylamido-7-methoxy-3-hydroxymethyl-3-cephem-4-carboxylic acid or an ester thereof, the product will be the corresponding 7-methoxy-3-carbamoyloxymethyl derivative.

The 3-hydroxymethyl cephalosporins used as starting materials in the process of this invention are available from other compounds and reaction techniques known in the art. For example, cephalosporin C, having the structure

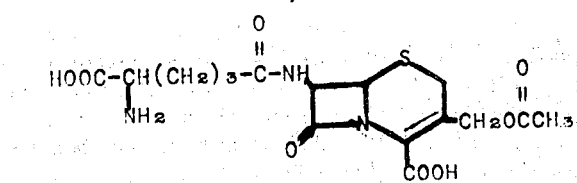

can be prepared by fermenting a nutrient medium with an appropriate Cephalosporium strain and separating the cephalosporin C from the fermentation product.

By means of well-known reaction techniques, cephalosporin C is readily converted to 3-acetoxymethyl derivative having any of the well-known amino-protecting groups in the 7-position and/or any of the well-known carboxy protecting groups in the 4-position.

The 3-acetoxymethyl derivative, or indeed cephalosporin C itself, can be conveniently converted to the desacetyl (3-hydroxymethyl) derivative by treatment with citrus acetylesterase for several hours in aqueous phosphate buffer at pH 6.5–7 according to the method of Jansen, Jang, and MacDonell, Archiv. Biochem., 15 (1947), 415–31.

In those instances in which it is desired to employ a starting material in which $R^o$ is 7-methoxy, a preparative scheme analogous to that delineated hereinabove using cephalosporin C is available. The starting material is prepared from the 7-methoxy analog of cephalosporin C. This compound in turn can be produced by fermentation using an organism identified as *Streptomyces lipmanii* NRRL 3584, and is the subject of application Ser. No. 847,923, filed Aug. 6, 1969, now abandoned, and replaced by application Ser. No. 60,556, filed Aug. 3, 1970.

The 7-methoxy analog of cephalosporin C can be converted to the corresponding desacetyl derivative as well as to other 7- and/or 4-substituted derivatives by reaction techniques similar to those described hereinabove for cephalosporin C.

A typical preparation of a primary carbamoyloxy compound in accordance with this invention is carried out in the following manner. Desacetyl cephalosporin C is obtained from either fermentation or enzymatic deacetylation of cephalosporin C. The 5'-amino group of desacetyl cephalosporin C is protected by reacting the antibiotic with N-carboethoxyphthalimide in phosphate buffer at a pH of about pH 8.5 to provide the phthalimido derivative. The N-phthalimido desacetyl cephalosporin C thus obtained is then reacted with two equivalents of diphenyl diazomethane in dioxane to provide the dibenzhydryl ester derivative.

The dibenzhydryl ester thus obtained is then reacted in acetone with trichloroacetyl isocyanate to provide the N-(trichloroacetyl)carbamoyloxymethyl group in the 3-position. This derivative is hydrolyzed to provide the primary carbamoyloxymethyl group in the 3-position. For example, the N-(trichloracetyl)carbamoyloxymethyl substituted cephalosporin is cleaved by chromatography over silica gel containing 10 percent water. The column is eluted with ethyl acetate to obtain dibenzhydryl 7-(5'-phthalimido-5'-carboxyvaleramido)-3-carbamoyloxymethyl-3-cephem-4-carboxylate.

Alternatively, the trichloroacetyl group can be cleaved by dissolving the cephalosporin derivative in methanol and adding a catalytic amount of sodium carbonate to the alcoholic solution.

The trichloroacetyl group also can be cleaved by dissolving the cephalosporin derivative in methanol and adding at least a molar equivalent of powdered zinc to the alcoholic solution. The thus obtained carbamoyloxymethyl derivative can be crystallized from suitable solvents, such as cold ethanol.

The active cephalosporin antibiotic can be obtained by removing the ester function in the 4-position, if one is present, and any protecting group on the 7-acylamido group. For example, the above dibenzhydryl ester can be dissolved in a mixture of trifluoroacetic acid and anisole at ice bath temperature and the solution allowed to stir for about four hours. In this manner both benzhydryl ester protecting groups are hydrolyzed to provide the diacid, 7-(5'-phthalimido-5'-carboxyvaleramido)-3-carbamoyloxymethyl-3-cephem-4-carboxylic acid.

Representative of the 3-carbamoyloxymethyl cephalosporins which can be prepared by the process of this invention are those which include in the 4-position the free carboxyl group or an ester group, the alcohol portion of which is illustrated by, for example, methyl, ethyl, n-propyl, isopropyl, n-butyl, sec-butyl, iso-butyl, t-butyl, amyl, hexyl, 2,2,2-trichloroethyl, 2,2,2-tribromoethyl, 2-iodoethyl, 1,1-dimethyl-2-propenyl, 1,1-dimethyl-2-butynyl, benzyl, p-nitrobenzyl, tetrahydropyranyl, succinimidomethyl, phthalimidomethyl, p-methoxybenzyl, 3,4-dimethoxybenzyl, cyanomethyl, p-nitrophenyl, 2,4-dinitrophenyl, 2,4,6-trinitrophenyl, bis(p-methoxyphenyl)methyl, triphenylmethyl, benzhydryl, benzyloxymethyl, acetoxymethyl, pivaloyloxymethyl, propionoxymethyl, acetyl, propionyl, phenacyl, trimethylsilyl, triethylsilyl, dichloromethylsilyl, dimethylbromosilyl, and the like.

The amino group in the 7-position of the 3-carbamoyloxymethyl cephalosporin can likewise be reacted with a broad range of substituents. Representative examples of the $R^5$ substituent when $R^4$ is hydrogen include the following: acetyl, propionyl, butyryl, valeryl, caproyl, azidoacetyl, cyanoacetyl, chloroacetyl, bromoacetyl, phenylacetyl, 2-thienylacetyl, 3-thienylacetyl, 2-furylacetyl, 3-furylacetyl, 2-pyrrolylacetyl, 3-pyrrolylacetyl, 4-chlorophenylacetyl, 3-trifluoromethylphenylacetyl, 4-hydroxyphenylacetyl, 3-tolylacetyl, 4-cumylacetyl, 4-methoxyphenylacetyl, 3-cyanophenylacetyl, 4-nitrophenylacetyl, phenoxyacetyl, thiophenoxyacetyl, pyridyloxyacetyl, p-nitrophenoxyacetyl, α-benzyloxycarbamidophenylacetyl, α-t-butoxycarbamidophenylacetyl, α-t-butoxycarbonylphenylacetyl, α-formyloxyphenylacetyl, α-cyanophenylacetyl, α-azidophenylacetyl, 3-sydnoneacetyl, 2-(1H-tetrazol-1-yl)acetyl, 5-amino-5-carboxyvaleryl, 5-benzyloxycarbamido-5-(4-nitrobenzyloxycarbonyl)-valeryl, 5-t-butoxycarbamido-5-t-butoxycarbonylvaleryl, 5-benzyloxycarbamido-5-benzhydryloxycarbonylvaleryl, 2-nitrophenylthio, 2-nitro-4-methoxyphenylthio, and the like.

When $R^4$ and $R^5$ are taken together with the nitrogen to which they are bonded, representative examples of the combination include, for example, phthalimido, succinimido, and the like.

Products typical of those which can be prepared by the process of this invention include the following:
p-nitrobenzyl 7-phenoxyacetamido-3-carbamoyloxymethyl-3-cephem-4-carboxylate p-nitrobenzyl 7-phenoxyacetamido-7-methoxy-3-carbamoyloxymethyl-3-cephem-4-carboxylate
t-butyl 7-(2-thienyl)acetamido-3-carbamoyloxymethyl-3-cephem-4-carboxylate
t-butyl 7-(2-thienyl)acetamido-7-methoxy-3-carbamoyloxymethyl-3-cephem-4-carboxylate
2,2,2-trichloroethyl 7-(α-t-butoxycarbamido)phenylacetamido-3-carbamoyloxymethyl-3-cephem-4-carboxylate
2,2,2-trichloroethyl 7-(α-t-butoxycarbamido)phenylacetamido-7-methoxy-3-carbamoyloxymethyl-3-cephem-4-carboxylate
benzhydryl 7-(α-formyloxy)phenylacetamido-3-carbamoyloxymethyl-3-cephem-4-carboxylate
benzhydryl 7-(α-formyloxy)phenylacetamido-7-methoxy-3-carbamoyloxy-3-cephem-4-carboxylate
benzyl 7-(3-sydnone)acetamido-3-carbamoyloxymethyl-3-cephem-4-carboxylate
benzyl 7-(3-sydnone)acetamido-7-methoxy-3-carbamoyloxymethyl-3-cephem-4-carboxylate
2-iodoethyl 7-[2-(1H-tetrazol-1-yl)]acetamido-3-carbamoyloxymethyl-3-cephem-4-carboxylate
2-iodoethyl 7-[2-(1H-tetrazol-1-yl)]acetamido-7-methoxy-3-carbamoyloxymethyl-3-cephem-4-carboxylate
7-phenylacetamido-3-carbamoyloxymethyl-3-cephem-4-carboxylic acid
7-phenylacetamido-7-methoxy-3-carbamoyloxymethyl-3-cephem-4-carboxylic acid
triphenylmethyl 7-succinimido-3-carbamoyloxymethyl-3-cephem-4-carboxylate
triphenylmethyl 7-succinimido-7-methoxy-3-carbamoyloxymethyl-3-cephem-4-carboxylate
trimethylsilyl 7-phenylthioacetamido-3-carbamoyloxymethyl-3-cephem-4-carboxylate
trimethylsilyl 7-phenylthioacetamido-7-methoxy-3-carbamoyloxymethyl-3-cephem-4-carboxylate
methyl 7-(2-furyl)acetamido-3-carbamoyloxymethyl-3-cephem-4-carboxylate
methyl 7-(2-furyl)acetamido-7-methoxy-3-carbamoyloxymethyl-3-cephem-4-carboxylate
benzhydryl 7-(α-t-butoxycarbonyl)phenylacetamido-3-carbamoyloxymethyl-3-cephem-4-carboxylate
benzhydryl 7-(α-t-butoxycarbonyl)phenylacetamido-7-methoxy-3-carbamoyloxymethyl-3-cephem-4-carboxylate
benzhydryl 7-(5-benzyloxycarbamido-5-benzhydryloxycarbonylvaleramido)-3-carbamoyloxymethyl-3-cephem-4-carboxylate
benzhydryl 7-(5-benzyloxycarbamido-5-benzhydryloxycarbonylvaleramido)-7-methoxy-3-carbamoyloxymethyl-3-cephem-4-carboxylate
benzyl 7-(2-nitrophenyl)sulfenamide-3-carbamoyloxymethyl-3-cephem-4-carboxylate
benzyl 7-(2-nitrophenyl)sulfenamide-7-methoxy-3-carbamoyloxymethyl-3-cephem-4-carboxylate
7-(2-nitro-4-methoxyphenyl)sulfenamide-3-carbamoyloxymethyl-3-cephem-4-carboxylic acid
7-(2-nitro-4-methoxyphenyl)sulfenamide-7-methoxy-3-carbamoyloxymethyl-3-cephem-4-carboxylic acid.

The process of this invention has been described with reference to the conversion of 7-substituted-3-hydroxymethyl cephalosporins to their corresponding 3-carbamoyloxymethyl derivatives. Although so described for purposes of convenience, the present invention is not restricted to the use of such starting materials. It is likewise possible to employ as starting material either a 7-substituted-amino-3-hydroxymethyl-2-cephem-4-carboxylic acid or ester thereof having the formula

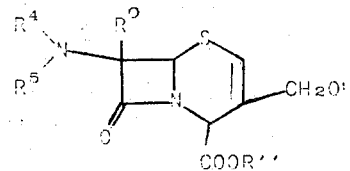

in which $R°$, $R''$, $R^4$ and $R^5$ are as herein defined, or a 7-substituted -amino-3-hydroxymethyl-3-cephem-1-oxide-4-carboxylic acid or ester thereof having the formula

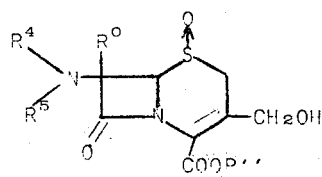

in which $R°$, $R''$, $R^4$ and $R^5$ are as herein defined. The above 3-hydroxymethyl-2-cephem and 3-hydroxymethyl-3-cephem-1-oxide structures can be converted to their corresponding 3-carbamoyloxymethyl derivatives by employing the two-step synthesis described herein for the cephalosporin 3-hydroxymethyl-3-cephem conversion. It is also possible to convert the 3-hydroxymethyl-3-cephem-1-oxide nucleus to a cephalosporin nucleus by reduction in accordance with methods recognized in the art. This reduction can be carried out prior to reaction of the 1-oxide with the isocyanate, subsequent to reaction with the isocyanate but prior to the selective cleavage step, or subsequent to both the isocyanate and cleavage steps.

In similar manner the 2-cephem starting material can be converted to the 3-cephem cephalosporin nucleus by oxidation and rearrangement to the corresponding 3-cephem-1-oxide followed by reduction to the 3-cephem cephalosporin nucleus (see, e.g., Webber et al., *J. Am. Chem. Soc.*, 91, (1969) pp. 5674–5675). The oxidation and reduction steps can be carried out at any point along the sequence of isocyanate reaction and cleavage. It will be readily apparent to those skilled in the art, therefore, that any of the modifications described in the foregoing merely represent alternative equivalent methods of practicing the process of the present invention.

An active antibiotic can be formed directly in the process of this invention in the instance in which the group $R''$ is hydrogen and the 7-position is appropriately substituted. In any event, the product obtained can readily be converted to an active antibiotic substance by methods which are now well recognized in the art.

The following examples are provided to illustrate this invention but are not intended in any way to be limiting on the scope thereof.

EXAMPLE I: PREPARATION OF 7-PHENOXYACETAMIDO-3-CARBAMOYLOXYMETHYL-3-CEPHEM-4-CARBOXYLIC ACID

To a solution of 2.1 g. (5 mmoles) of t-butyl-7-phenoxyacetamido-3-hydroxymethyl-2-cephem-4-carboxylate in 25 ml. of dry acetone was added 1.0 ml. of trichloroacetyl isocyanate. The resulting mixture was stirred at room temperature for 1.5 hours and then evaporated to dryness. The residue was recrystallized from carbon tetrachloride to produce 2.38 g. of t-butyl 7-phenoxyacetamido-3-(N-trichloroacetyl)carbamoyloxymethyl-2-cephem-4-carboxylate, m.p., 74°–6°C.

Analysis, Calc. for $C_{23}H_{24}N_3O_8Cl_3S$: C, 45.36; H, 3.97; N, 6.90; Cl, 17.46. Found: C, 45.37; H, 3.99; N, 6.94; Cl, 17.74

To a solution of 1.212 g. (2 mmoles) of the 3-(N-trichloroacetyl)carbamoyloxymethyl derivative in 50 ml. of methanol was added 1.212 g. of zinc dust. The mixture was stirred at room temperature for about 1.5 hours after which it was filtered, and the filtrate was evaporated to dryness. The residue was dissolved in ethyl acetate, and the solution washed successively with cold 5 percent HCl, sodium bicarbonate solution, and saturated NaCl solution. The ethyl acetate solution was then dried over magnesium sulfate, filtered, and evaporated to a residue. The residue was recrystallized from methyl isobutyl ketone to give 840 mg. of t-butyl 7-phenoxyacetamido-3-carbamoyloxymethyl-2-cephem-4-carboxylate, m.p., 140°–1°C.

Analysis, Calc. for $C_{21}H_{25}N_3O_7S$: C, 54.42; H, 5.44; N, 9.07. Found: C, 54.39; H, 5.29: N, 9.06.

To a cooled solution of 375 mg. (0.8 mmoles) of the above 3-carbamoyloxymethyl derivative in 50 ml. of a 1:1 mixture of isopropanol and dichloromethane was added 160 mg. of 87 percent m-chloroperbenzoic acid in 10 ml. of isopropanol. The reaction mixture was allowed to warm slowly and after about 1 hour was evaporated to dryness. The residue was dissolved in ethyl acetate and washed successively with sodium bicarbonate solution and saturated NaCl solution. The ethyl solution was then dried over magnesium sulfate, filtered and evaporated. Recrystallization from a mixture of methyl isobutyl ketone and acetone gave t-butyl 7-phenoxyacetamido-3-carbamoyloxymethyl-3-cephem-4-carboxylate-1-oxide, m.p., 191°–3°C.

Analysis, Calc. for $C_{21}H_{25}N_3O_8S$: C, 52.61; H, 5.26; N, 8.99. Found: C, 52.64; H, 5.29; N, 8.74.

The above 3-cephem-1-sulfoxide, prepared from 2.69 mmoles of the corresponding 2-cephem-1-sulfide was dissolved in 20 ml. of dimethylformamide, cooled, and 600 mg. of powder stannous chloride and 2.0 ml. of acetyl chloride were added. The mixture was cooled for about five minutes and then allowed to stand for about two hours at room temperature, after which it was concentrated under reduced pressure. The residue was taken up in ethyl acetate and washed successively with saturated NaCl solution, 5 percent HCl, sodium bicarbonate solution, and NaCl solution. The ethyl acetate solution was then dried over magnesium sulfate, filtered, and evaporated to give 968 mg. of product. The product was purified by passage over a chromatographic column comprising silica gel and 15 percent water, using a solution of 13–16 percent ethyl acetate in benzene. The ethyl acetate-benzene was evaporated, and the residue recrystallized from methyl isobutyl ketone to give t-butyl 7-phenoxyacetamido-3-carbamoyloxymethyl-3-cephem-4-carboxylate, m.p., 80°–2°C., which exhibited an NMR spectrum consistent with its structure and which was shown to be pure by thin-layer chromatography.

A solution of 145 mg. of t-butyl 7-phenoxyacetamido-3-carbamoyloxymethyl-3-cephem-4-carboxylate in 10 ml. of 98–100 percent formic acid was allowed to stand at room temperature for about two hours. The mixture was evaporated to dryness and the residue triturated with ethyl acetate to give 7-phenoxyacetamido-3-carbamoyloxymethyl-3-cephem-4-carboxylic acid having a m.p. of 130°–40°C.

EXAMPLE II: PREPARATION OF 7-[D(-)-α-AMINOPHENYLACETAMIDO]-3-CARBAMOYLOXYMETHYL-3-CEPHEM-4-CARBOXYLIC ACID

A solution of 2.51 g. of D(-)-N(t-butoxycarbonyl)-phenylglycine in 30 ml. of tetrahydrofuran was stirred for about 20 minutes at −10°C. with 1.40 g. (10 mmoles) of isobutyl chloroformate, 1.4 ml. (10 mmoles) of triethylamine and 2 drops of N,N-dimethylbenzyl amine. To this solution was then added 2.50 g. of 7-amino-3-hydroxymethyl-3-cephem-4-carboxylic acid dissolved in 30 ml. of water adjusted to pH 8.5 with triethylamine. The solution was allowed to warm gradually to 25°C. over a period of 3.5 hours. The tetrahydrofuran was evaporated in vacuo, ethyl acetate was added, and the pH was adjusted to 2.0 with dilute HCl. The ethyl acetate was separated from the aqueous layer, dried over $Na_2SO_4$, and evaporated to give a gummy oil. The above product was dissolved in 80 ml. of dioxane and 2.3 g. of diphenyldiazomethane was added. After about 1 hour, it was evident from thin-layer chromatography that no starting material remained in the reaction mixture. The dioxane was then removed in vacuo, and the residue was suspended in a small amount of dichloromethane. About 200 ml. of petroleum ether was added, and the mixture was swirled for a few minutes. The petroleum ether layer containing excess diphenyldiazomethane was removed and discarded, and the dichloromethane layer was evaporated to produce a residue of benzyhydryl 7-[D(-)-(α-t-butoxycarbamido)phenylacetamido]-3-hydroxymethyl-3-cephem-4-carboxylate.

The above ester was dissolved in 100 ml. of acetone and stirred at 25°C., during which time 3 ml. of trichloroacetyl isocyanate was added. Vigorous bubbling occurred, and the temperature of the mixture increased slightly. The mixture was refrigerated overnight and evaporated to dryness to produce benzhydryl 7-[D(-)-(α-t-butoxycarbamido)phenylacetamido)-3-(N-trichloroacetyl)carbamoyloxymethyl-3-cephem-4-carboxylate. The N-substituted 3-carbamoyloxymethyl derivative produced above was dissolved in a mixture of 30 ml. of tetrahydrofuran and 150 ml. of methanol. About 100 mg. of sodium carbonate was added. The reaction mixture was stirred for about four hours and then evaporated to dryness. The residue was purified by dissolving it in a mixture of 20–30 percent ethyl acetate in benzene and passing it over 300 g. of silica gel containing 15 percent water. About 2.3 g. of a crystalline product which by NMR spectra proved to be benzhydryl 7-[D(-)-(α-t-butoxycarbamido)phenylacetamido]-3- carbamoyloxymethyl-3-cephem-4-carboxylate, m.p., 184°–6°C., was recovered.

Analysis, Calc. for $C_{35}H_{36}N_4O_8S$: C, 62.49; H, 5.39; N, 8.33. Found: C, 62.25; H, 5.63; N, 8.10.

A solution of 1.1 g. of the above 3-carbamoyloxymethyl derivative was dissolved in 5 ml. of dichloromethane containing 1.0 ml. of anisole and 3 ml. of trifluoroacetic acid. The mixture was stirred at 25°C. for about 1 hour. At this point it was shown by thin-layer chromatography that no starting material remained in the reaction mixture. The solvents were then evaporated in vacuo and the residue suspended in a mixture of 25 ml. of water and 25 ml. of methyl isobutyl ketone. The pH of the mixture was adjusted to pH 4.9 by addition of tributylamine. The aqueous phase was separated from the organic phase, and the aqueous solution was refrigerated overnight. No crystals separated during refrigeration, and the aqueous solution was then concentrated to about 5 ml. and 20 ml. of acetonitrile was added. A white precipitate formed and was collected by filtration and washed with a mixture of 20 ml. of acetonitrile and 20 ml. of ethyl ether. About 180 mg. of solid was collected and dried. NMR analysis verified the structure to be 7-[D(-)-α-amino-α-phenylacetamido]-3-carbamoyloxymethyl-3-cephem-4-carboxylic acid.

EXAMPLE III: PREPARATION OF BENZHYDRYL 7-FORMAMIDO-3-CARBAMOYLOXYMETHYL-3-CEPHEM-4-CARBOXYLATE

About 1.2 ml. (10 mmoles) of pivaloyl chloride was dissolved in 25 ml. of tetrahydrofuran. To this solution, stirred and cooled in an ice bath, was added two drops of N,N-dimethylbenzylamine, 1.4 ml. (10 mmoles) of triethylamine and 0.37 ml. (10 mmoles) of 98–100 percent formic acid. Stirring of the resulting reaction mixture in an ice bath was continued for about 1.5 hours. To this mixture was then added about 2.3 g. (10 mmoles) of 7-amino-3-hydroxymethyl-3-cephem-4-carboxylic acid dissolved in 25 ml. of water adjusted to a pH of about 8.5 by addition of triethylamine. The resulting reaction mixture was stirred at room temperature for about 3 hours. The reaction mixture was then cooled in an ice bath and about 300 ml. of ethyl acetate was added and the pH lowered to about 2.5 by addition of dilute hydrochloric acid. The organic layer was separated from the aqueous layer, and the aqueous layer was washed with a mixture of 10 percent ethanol in ethyl acetate. The wash was added to the organic layer, and the entire portion was dried over sodium sulfate. The organic layer was filtered and the filtrate evaporated to produce a residue of 7-formamido-3-hydroxymethyl-3-cephem-4-carboxylic acid.

The free acid isolated above was dissolved in 50 ml. of dioxane. The solution was stirred at room temperature, and 20 ml. of dioxane containing 1.0 g. of diphenyldiazomethane was added. The resulting mixture was stirred for about one hour, and the solvent was evaporated to produce a residue of benzhydryl 7-formamido-3-hydroxy-methyl-3-cephem-4-carboxylate.

The above ester was dissolved in dichloromethane, cooled in an ice bath, and 1 ml. of trichloroacetyl isocyanate was added. The mixture was refrigerated overnight, and the solvent was then evaporated to produce a residue of benzhydryl 7-formamido-3-(N-trichloroacetyl)carbamoyloxymethyl-3-cephem-4-carboxylate.

The resulting N-substituted carbamoyloxymethyl derivative was dissolved in a mixture of 50 ml. of methanol and 20 ml. of tetrahydrofuran. About 100 mg. of sodium carbonate was added. The mixture was stirred at room temperature for about 4 hours. The solvent was then evaporated, and the residue was dissolved in a mixture of ethyl acetate and methyl isobutyl ketone. The resulting organic solution was extracted three times with dilute hydrochloric acid. A residue containing benzhydryl 7-formamido-3-carbamoyloxymethyl-3-cephem-4-carboxylate was obtained upon evaporation of the solvent. The residue was purified by dissolving it in 60 ml. of a mixture of 20 percent ethyl acetate and benzene and passing the solution through a column of 100 g. of silica gel containing 15 percent water. The sample was eluted using mixtures of ethyl acetate and benzene containing successively greater proportions of ethyl acetate. About 100 mg. of a substance established by NMR to be benzhydryl 7-formamido-3-carbamoyloxymethyl-3-cephem-4-carboxylate was recovered upon evaporation of the solvent mixture.

EXAMPLE IV: PREPARATION OF BENZHYDRYL 7-α-HYDROXYPHENYLACETAMIDO-3-CARBAMOYLOXYMETHYL-3-CEPHEM-4-CARBOXYLIC ACID

About 1.80 g. (10 mmoles) of 0-formylmandelic acid was dissolved in 100 ml. of dichloromethane. To this solution, stirred and cooled in an ice bath, were added five drops of dimethylformamide and 1.2 ml. (1.4 equivalents) of oxalyl chloride. The resulting reaction mixture was stirred in an ice bath for about one hour.

In a separate flask, 2.6 g. (10 mmoles, 87 percent purity) of 7-amino-3-hydroxymethyl-3-cephem-4-carboxylic acid was dissolved in 30 ml. of water by adjusting the pH of the mixture to about 8.0–8.5 by addition of triethylamine. Upon dissolution of the acid, 20 ml. of acetone was added. To this solution, stirred and cooled in an ice bath, the previously prepared 0-formylmandeloyl chloride was added dropwise. Upon completion of addition, the pH of the mixture was 3.5, and triethylamine was added to raise the pH to about pH 8.0. Cooling was discontinued and the reaction mixture was allowed to warm to room temperature over a three hour period. The mixture was then once again cooled in an ice bath, and the pH was lowered to about 2.5 by addition of dilute hydrochloric acid. The reaction mixture was then extracted with a mixture of 10 percent ethanol in ethyl acetate. The ethanol-ethyl acetate extract was dried over sodium sulfate, filtered, and evaporated to produce a residue of 7-(0-formyl)-mandelamido-3-hydroxymethyl-3-cephem-4-carboxylic acid.

The residue was dissolved in 50 ml. of dioxane and 1.96 g. (10 mmoles) of diphenyldiazomethane dissolved in 25 ml. of dioxane was added. The mixture was stirred at room temperature for about one hour, after which the solvent was evaporated to produce a residue of benzhydryl 7-(0-formyl)mandelamindo-3-hydroxymethyl-3-cephem-4-carboxylate.

The benzhydryl ester residue was dissolved in dichloromethane, and the solution was stirred in an ice bath. To this solution was added 1.5 ml. of trichloroacetyl isocyanate. The mixture was refrigerated overnight, and then the solvent was evaporated to produce a residue of benzhydryl 7-(0-formyl)-mandelamido-3-(N-trichloroacetyl)carbamoyloxymethyl-3-cephem-4-carboxylate.

The N-substituted carbamoyloxymethyl derivative was dissolved in a mixture of 50 ml. of methanol and 10 ml. of tetrahydrofuran. To this solution, stirred at room temperature, was added 100 mg. of sodium carbonate. The resulting reaction mixture was stirred at room temperature for about 3 hours. The solvents were then evaporated, leaving a residue which was dissolved in ethyl acetate, and the ethyl acetate solution was then washed with dilute hydrochloric acid. The washed ethyl acetate solution was evaporated to yield 4.4 g. of crude product. The crude material was dissolved in 100 ml. of a mixture of 15 percent etyl acetate in benzene, and the solution was passed over a column of 200 g. of silica gel containing 15 percent water. The sample was eluted using mixtures of ethyl acetate and benzene containing progressively increasing concentrations of ethyl acetate. The sample collected thereby was recrystallized from ethyl acetate to give 130 mg. of benzhydryl 7-α-hydroxyphenylacetamido-3carbamoyloxymethyl-3-cephem-4-carboxylate, m.p., 212°–3°C.

Analysis, Calc. for $C_{30}H_{27}N_3O_7S$: C, 62.82; H, 4.74; N, 7.33. Found: C, 62.65; H, 4.85; N, 7.11.

EXAMPLE V: PREPARATION OF 7-α-CARBOXYPHENYLACETAMIDO-3-CARBAMOYLOXYMETHYL-3-CEPHEM-4-CARBOXYLIC ACID

About 2.6 g. (10 mmoles) of 7-amino-3-hydroxymethyl-3-cephem-4-carboxylic acid was suspended in 100 ml. of tetrahydrofuran. The suspension was stirred and cooled in an ice bath, and 5 ml. of N,N-bis(trimethylsilyl)acetamide were added. The mixture was stirred for about three hours, after which an additional 2.5 ml. of N,N-bis(trimethylsilyl)acetamide was added. Stirring was continued for an additional 4.5 hours after which most of the material had dissolved. Another 2.5 ml. of N,N-bis(trimethylsilyl)acetamide was added, and the reaction mixture was allowed to stir overnight.

About 2.36 g. (10 mmoles) of the mono-t-butyl ester of phenylmalonic acid was dissolved in 100 ml. of dichloromethane. The mixture was stirred in an ice bath, and 5 drops of dimethylformamide and 1 ml. of oxalyl chloride were added. Stirring was continued for about one hour, after which the solvent was evaporated and the residue dissolved in tetrahydrofuran.

The tetrahydrofuran solution was added dropwise at room temperature to the previously prepared trimethylsilyl 7-trimethylsilylamino-3-trimethylsilyloxymethyl-3-cephem-4-carboxylate. Upon completion of addition of the prepared reagent, the solvents were evaporated from the mixture, and a mixture of cold water and ethyl acetate was added. The ethyl acetate layer was separated from the aqueous layer at pH 2.5, and the aqueous layer was extracted two times with a mixture containing 10 percent ethanol in ethyl acetate. The extracts were combined with the ethyl acetate layer and the entire organic portion was dried over sodium sulfate, filtered, and the filtrate was evaporated to produce a residue of 7-(α-t-butoxycarbonyl)phenylacetamido-3-hydroxymethyl-3-cephem-4-carboxylic acid.

The previously obtained product was dissolved in dioxane, and about 50 ml. of dioxane containing 1.96 g. (10 mmoles) of diphenyldiazomethane was added. The mixture was stirred at room temperature for about one hour, after which the solvent was evaporated to produce a residue of benzhydryl 7-(α-t-butoxycarbonyl)phenylacetamido-3-hydroxymethyl-3-cephem-4-carboxylate.

The benzhydryl ester was dissolved in dichloromethane, and the solution was stirred in an ice bath while 1 ml. of trichloroacetyl isocyanate was added. The mixture was refrigerated overnight. Dichloromethane was then evaporated to produce a residue of benzhydryl 7-(α-t-butoxycarbonyl)phenylacetamido-3-N-trichloroacetyl)carbamoyloxymethyl-3-cephem-4-carboxylate.

The N-substituted carbamoyloxymethyl derivative was dissolved in a mixture of 50 ml. of methanol and 10 ml. of tetrahydrofuran. About 100 mg. of sodium carbonate was added, and the mixture was stirred for about four hours at room temperature. The solvents were evaporated from the reaction mixture, and the residue was dissolved in ethyl acetate. The ethyl acetate solution was washed with dilute hydrochloric acid and dried over sodium sulfate, and the solvent was evaporated to produce a residue of crude product. The product was purified by dissolving it in benzene and passing it over a column of 250 g. of silica gel containing 15 percent water. The sample was eluted from the column using mixtures of ethyl acetate and benzene containing successively 5 percent, 10 percent, 15 percent, and 20 percent of ethyl acetate. NMR analysis showed the product obtained from the column to be benzhydryl 7-(α-t-butoxycarbonyl)phenylacetamido-3-carbamoyloxymethyl-3-cephem-4-carboxylate.

About 200 mg. of the above recovered diester was dissolved in 3 ml. of cold trifluoroacetic acid containing four drops of anisole. The mixture was stirred in an ice bath for about one hour. A small amount of benzene was added to the mixture, and the solvents were evaporated. The residue was dissolved in a mixture of ethyl acetate and sodium bicarbonate solution. The resulting mixture separated into an aqueous and an organic layer. The organic ethyl acetate layer was separated and extracted two times with saturated aqueous sodium bicarbonate solution. All of the bicarbonate solutions were combined and made acid by addition of dilute hydrochloric acid. Product separated from the bicarbonate solutions and was extracted into ethyl acetate. The ethyl acetate layer was dried over sodium sulfate and evaporated to give 105 mg. of product identified by NMR analysis as 7-α-carboxyphenylacetamido-3-carbamoyloxymethyl-3-cephem-4-carboxylic acid.

EXAMPLE VI: PREPARATION OF BENZHYDRYL 7-(5'-PHTHALIMIDO-5'-BENZHYDRYLOXYCARBONYL)VALERAMIDO-3-CARBAMOYLOXYMETHYL-3-CEPHEM-4-CARBOXYLATE

About 3.71 g. (10 mmoles) of desacetyl cephalosporin C was dissolved in 100 ml. of water containing disodium hydrogen phosphate. About 40 ml. of acetone was added, and the pH of the mixture was adjusted to about 9.0 by addition of a sufficient amount of a solution prepared by dissolving 10 g. of trisodium phosphate in 50 ml. of water. The resulting mixture was stirred at room temperature, and about 60 ml. of acetone containing 4.38 g. of N-carboxyethylphthalimide was added dropwise. The pH of the mixture was maintained at about 9.0 by addition of more of the trisodium phosphate solution. Upon completion of the addition of the N-carboxyethylphthalimide, the reaction mixture was stirred for about fifteen minutes. The acetone was then evaporated in vacuo. The aqueous residue was adjusted to pH 7.0 by addition of dilute phosphoric acid. The resulting mixture was then extracted three times with ethyl acetate, and the aqueous layer was cooled in an ice bath. Dilute phosphoric acid was added to lower the pH to about pH 2. The acidified layer was then extracted three times with 75 ml. each of a cold mixture of 10% ethanol and ethyl acetate. The organic extract was evaporated in vacuo to about 25 ml. TLC of the resulting concentrate indicated the presence of the desired 7-(5'-phthalimido-5'-carboxy)-valeramido-3-hydroxymethyl-3-cephem-4-carboxylic acid.

To the above product in ethyl acetate was added about 50 ml. of dioxane, and the mixture was cooled to about 0°C. in an ice bath. About 3.5 g. (18 mmoles) of diphenyldiazomethane dissolved in 25 ml. of dioxane was then added, and the mixture was allowed to stir in an ice bath for about 3 hours. The solvents were then evaporated in vacuo from the reaction mixture to leave a residue of about 20 ml. About 150 ml. of methylene chloride was added, and the mixture was washed with dulute aqueous sodium bicarbonate solution. The methylene chloride layer, containing benzhydryl 7-(5'-phthalimido-5'-benzhydryloxycarbonyl)valeramido-3-hydroxymethyl-3-cephem-4-carboxylate, was separated from the aqueous bicarbonate, dried over sodium sulfate, and filtered.

The methylene chloride solution was stirred and cooled in an ice bath. About 1.0 ml. of trichloroacetyl isocyanate was added. The mixture was stirred for about one hour, after which an additional 1.0 ml. of trichloroacetyl isocyanate was added. The stirring was continued at about 0°C. for 1 hour, and the mixture was then refrigerated overnight. About 2.5 g. of trichloroacetamide crystallized from the mixture and was filtered off. The methylene chloride was evaporated from the filtrate, and the residue was dissolved in carbon tetrachloride. A remaining amount of trichloroacetamide failed to dissolve and was filtered off. The carbon tetrachloride filtrate was then evaporated to produce a residue of about 5.0 g. of benzhydryl 7-(5'-phthalimido-5'-benzhydryloxycarbonyl)valeramido-3-(N-trichloroacetyl)carbamoyloxymethyl-3-cephem-4-carboxylate.

The above N-substituted 3-carbamoyloxymethyl derivative was dissolved in benzene and passed onto a column of 250 g. of silica gel containing 15 percent water. The sample was eluted from the column by passing in succession a 500 ml. portion each of the following solvents: benzene, 2 percent ethyl acetate in benzene, 4 percent ethyl acetate in benzene, 6 percent ethyl acetate in benzene, and 8 percent ethyl acetate in benzene. Pure ethyl acetate was then passed through the column. Fractions containing about 100 ml. each were collected during the passage of the above solvents through the column. Fractions 26 and 27 contained product, and these were combined and the solvents evaporated to produce a residue of 2.2 g. of material. This material was dissolved in a mixture of 10 percent ethyl acetate in benzene and passed onto another chromatographic column comprising 200 g. of silica gel containing 15 percent water. The sample was eluted by passing successively through the column 500 ml. of 10 percent ethyl acetate in benzene, 1000 ml. of 12 percent ethyl acetate in benzene, 500 ml. of 16 percent ethyl acetate in benzene, 500 ml. of 20 percent ethyl acetate in benzene, followed by 50 percent ethyl acetate in benzene. Fractions of about 100 ml. each were collected. It was found that fractions 34 and 35 contained the desired product. These fractions were evaporated to produce to be benzhydryl 7-(5'-phthalimido-5'-benzhydryloxycarbonyl)-valeramido-3-carbamoyloxymethyl-3-cephem-4-carboxylate.

EXAMPLE VII: PREPARATION OF BENZHYDRYL 7-[D(-)-α-(t-BUTOXYCARBAMIDO)-PHENYLACETAMIDO]-3-CARBAMOYLOXYMETHYL-3-CEPHEM-4-CARBOXYLATE

About 2.5 g. of 7-amino-3-hydroxymethyl-3-cephem-4-carboxylic acid was dissolved in 30 ml. of water by adjusting the pH of the mixture to about 8.5 by addition of triethylamine. The mixed anhydride of D(-)-N-(t-butoxycarbonyl)phenylglycine was prepared in tetrahydrofuran in accordance with the procedure described in Example II. The above cephalosporin was added to the mixed anhydride solution, and the resulting reaction mixture was stirred for 3 hours at a pH maintained at about 7.5 by addition of triethylamine. The tetrahydrofuran was evaporated in vacuo, ethyl acetate was added, and the pH was adjusted to 2.0 by addition of dilute aqueous HCl. The ethyl acetate was separated from the aqueous layer, dried over sodium sulfate, and evaporated. The residue was dissolved in about 75 ml. of dioxane, and a solution of 2.0 g. of diphenyldiazomethane in 30 ml. of dioxane was added. The mixture was stirred at room temperature for about one hour, and the reaction mixture, containing benzhydryl 7-[D(-)-α-(t-butoxycarbamido)phenylacetamido]-3-hydroxymethyl-3-cephem-4-carboxylate, was stored under refrigeration.

About one-half of the mixture containing the benzhydryl ester was evaporated to dryness. Petroleum ether was added to the residue to leach out the excess diphenyldiazomethane. A resulting flocculent white material was dissolved in methylene chloride, and to this solution, stirred at room temperature, was added 0.35 ml. (4 mmoles) of chlorosulfonyl isocyanate. The reaction mixture immediately turned from a light red to a light yellow, and thin-layer chromatography showed that no starting material remained in the reaction mixture. The methylene chloride was evaporated from the mixture, and the residue was recrystallized from ethyl acetate to produce 1.6 g. of benzhydryl 7-[D(-)-α-(t-butoxycarbamido)phenylacetamido]-3-(N-chlorosulfonyl)carbamoyloxymethyl-3-cephem-4-carboxylate.

About 350 mg. of the crystalline chlorosulfonyl derivative was suspended in about 50 ml. of tetrahydrofuran. The mixture was maintained at about room temperature, and 1 ml. of a solution of 10 g. of $Na_2SO_3 \cdot 9H_2O$ in 40 ml. of water was added. The resulting mixture was stirred for about 15 minutes during which time the reaction mixture turned from a light yellow to a dark orange. The solvent was then evaporated and the residue dissolved in chloroform. The chloroform solution was washed with a 10 percent sodium chloride solution, dried over sodium sulfate, filtered, and evaporated to give 210 mg. of a solid established by TLC and NMR analyses to be benzhydryl 7-[D(-)-α-(t-butoxycarbamido)phenylacetamido]-3-carbamoyloxymethyl-3-cephem-4-carboxylate.

EXAMPLE VIII: PREPARATION OF 7-AMINO-3-CARBAMOYLOXYMETHYL-3-CEPHEM-4-CARBOXYLIC ACID

About 5 g. (20 mmoles/93 percent purity) of 7-amino-3-hydroxymethyl-3-cephem-4-carboxylic acid was dissolved in 80 ml. of cold water to which was added 20 ml. of 1N sodium hydroxide with the pH of the mixture being maintained below 8.5. About 30 ml. of tetrahydrofuran was added, and about 50 ml. of tetrahydrofuran containing 4.35 g. of o-nitrophenylsulfenyl chloride was added dropwise. The pH of the mixture was maintained between 8.0–8.5 by addition of 1N sodium hydroxide. Upon completion of the addition, the resulting mixture was stirred in an ice bath for about 2 hours. The pH of the mixture was then lowered to about 2.5 by addition of 1N sulfuric acid, and the resulting mixture was extracted with 1.5 liters of ethyl acetate. The ethyl acetate extract was washed with 10 percent aqueous sodium chloride solution, dried over sodium sulfate, and evaporated to a volume of about 500 ml. The concentrate was then once again dried over sodium sulfate, filtered, and the solvents evaporated. The residue was then twice dissolved in dioxane, and the dioxane evaporated to remove residual water.

The resulting crude 7-(2-nitrophenyl)sulfenamide-3-hydroxymethyl-3-cepham-4-carboxylic acid was dissolved in 250 ml. of methylene chloride containing 2.8 ml. (20 mmoles) of triethylamine. The resulting mixture was maintained in a nitrogen atmosphere and cooled in an ice bath. About 50 ml. of methylene chloride containing 3 ml. of trichloroacetyl isocyanate was slowly added dropwise. Upon completion of addition of the isocyanate, the mixture was stirred for an additional 20 minutes. The methylene chloride was then evaporated from the mixture, and the residue was dissolved in 500 ml. of water containing 5 g. of sodium bicarbonate. The solution was washed with ethyl acetate from which a difficulty separable emulsion formed. Ethyl acetate was withdrawn and evaporated, and the resulting residue was dissolved in a saturated aqueous sodium bicarbonate solution which was combined with the original aqueous solution. The pH of the mixture was adjusted to 8.5 by addition of dilute sulfuric acid, and the mixture was allowed to stand at room temperature overnight. The bicarbonate solution was then cooled, and 500 ml. of ethyl acetate was added. The pH of the mixture was lowered to 2.5 by addition of 1N sulfuric acid. The ethyl acetate layer was separated from the aqueous layer, and the aqueous layer was washed two times with additional ethyl acetate. The organic portions were combined and washed with 10 percent aqueous sodium chloride solution. The organic layer was then dried over sodium sulfate, filtered, and evaporated. The residue was re-dissolved in dioxane, and evaporated to remove residual water. A residue of 7.2 g. containing 7-(2-nitrophenyl)sulfenamide-3-carbamoyloxymethyl-3-cephem-4-carboxylic acid was recovered.

The residue was re-dissolved in 30 ml. of trifluoroacetic acid, and the resulting solution was stirred in an ice bath for about 2 hours. Benzene was added to the mixture, and the total was evaporated to a residue. The residue was redissolved in a mixture of 3 percent aqueous hydrochloric acid and ethyl acetate. The pH of the acid solution (total volume 700 ml.) was 0.9. The acid solution was separated from the ethyl acetate layer and washed three times with additional ethyl acetate, and the pH of the acid solution was adjusted to 1.5 by addition with cooling of concentrated ammonium hydroxide. The resulting mixture was then evaporated to about 300 ml. About 200 ml. of methanol was added, and the pH was adjusted to 3.7 by addition with cooling of concentrated ammonium hydroxide. The resulting mixture was then refrigerated during which product crystallized from the solution. 7-Amino-3-carbamoyloxymethyl-3-cephem-4-carboxylic acid (1.96 g.), was recovered by filtration.

EXAMPLE IX: PREPARATION OF 7-AMINO-3-CARBAMOYLOXYMETHYL-3-CEPHEM-4-CARBOXYLIC ACID

About 5 g. (20 mmoles/93 percent purity) of 7-amino-3-hydroxymethyl-3-cephem-4-carboxylic acid was dissolved in about 80 ml. of water by addition of about 20 ml. of 1N sodium hydroxide. The pH of the resulting mixture was 8–9. Upon completion of the solution, about 30 ml. of tetrahydrofuran was added. To the resulting solution 50 ml. of tetrahydrofuran containing 3.79 g. of o-nitrophenylsulfenyl chloride was added dropwise. The pH of the reaction mixture was maintained at 8.0-8.5 by addition of 1N sodium hydroxide. Upon completion of the addition, the resulting mixture was stirred in an ice bath for about 2 hours. To the mixture was then added 200 ml. of water, 1 liter of ethyl acetate, and sufficient 1N sulfuric acid to lower the pH of the mixture to 2.5. The resulting organic layer was separated from the aqueous layer. The aqueous layer was washed three times, each with a 600 ml. portion of ethyl acetate which was added to the organic layer. The organic layer was then washed with aqueous 10 percent sodium chloride, dried over sodium sulfate, and evaporated.

The residue, containing 7-(2-nitrophenyl)sulfenamide-3-hydroxymethyl-3-cephem-4-carboxylic acid, was dissolved in dioxane, and the solution was evaporated to remove residual water. The residue was then redissolved in 300 ml. of a mixture of dioxane and tetrahydrofuran. About 100 ml. of dioxane containing 4.0 g. (20 mmoles) of diphenyldiazomethane was added with stirring. The solvent was evaporated from the mixture to produce a residue containing benzhydryl 7-(2-nitrophenyl)sulfenamide-3-hydroxymethyl-3-cephem-4-carboxylate as well as excess diphenyldiazomethane.

The residue was dissolved in methylene chloride, and to the resulting solution, stirred in an ice bath, was added 4 ml. of trichloroacetyl isocyanate. The resulting mixture was refrigerated overnight. A precipitate formed in the methylene chloride solution, and the precipitate was removed by filtration. The filtrate was evaporated to produce a residue containing benzhydryl 7-(2-nitrophenyl)sulfenamide-3-(N-trichloroacetyl)carbamoyloxymethyl-3-cephem-4-carboxylate.

The residue was then dissolved in a 2:1 mixture of methanol and tetrahydrofuran. About 200 mg. of sodium carbonate was added, and the solution was stirred at room temperature for about 2 hours, during which time the sodium carbonate dissolved. An additional 100 mg. of sodium carbonate was added. The mixture was stirred for an additional 2 hours after which the sodium carbonate had gone into solution. Another 100 mg. of sodium carbonate was added, and the reaction mixture was stirred for an additional 4 hours. The solvents were then evaporated from the reaction mixture to produce a residue which was dissolved in ethyl acetate and washed with aqueous 1 percent sulfuric acid followed by aqueous sodium chloride. The ethyl acetate solution was then dried over sodium sulfate and evaporated to give 16.5 g. of a crude foam containing benzhydryl 7-(2-nitrophenyl)sulfenamide-3-carbamoyloxymethyl-3-cephem-4-carboxylate.

The crude foam was then dissolved in a cold mixture of 5 ml. of anisole and 45 ml. of trifluoroacetic acid. The resulting mixture was stirred in an ice bath for about 1.5 hours. To the resulting reaction mixture was added about 300 ml. of benzene, and the mixture was evaporated to a residue. The residue was dissolved in about 100 ml. of benzene which was then evaporated. The residue was then dissolved in a mixture of 250 ml. of 3 percent aqueous hydrochloric acid and 250 ml. of ethyl acetate. The pH of the resulting solution was 1.0. A portion of the solid material had not dissolved, and therefore another 250 ml. of 3 percent aqueous hydrochloric acid was added followed by 200 ml. of 10 percent aqueous hydrochloric acid. All of the solid was now in solution, and the pH of the mixture was 0.3. The ethyl acetate layer was separated from the aqueous layer, and the aqueous layer was washed four times with ethyl acetate. The aqueous layer was then evaporated to about 200 ml., and, while being cooled in an ice bath, the pH was increased to 3.7 by addition of 50 percent aqueous ammonium hydroxide. The resulting mixture was refrigerated for three days during which time product precipitated therefrom. The product was filtered, washed with ethanol, ethyl ether, and dried to give 2.28 g. of 7-amino-3-carbamoyloxymethyl-3-cephem-4-carboxylic acid.

I claim:

1. A process for preparing a compound having the formula

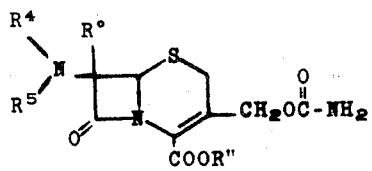

which comprises the sequence of reacting a compound of the formula

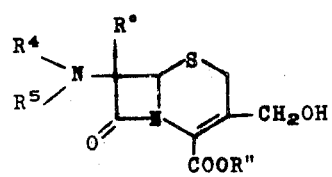

with an N-substituted isocyanate of the formula

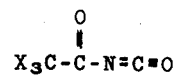

in which X is halogen, to produce a corresponding 3-(N-substituted) carbamoyloxymethyl derivative, and cleaving the N-substituent in the presence of silica gel, an aqueous buffer solution having a pH of from about 5 to about 9, an alkali or alkaline earth metal carbonate, bicarbonate, or sulfite, or zinc with a $C_1$-$C_4$ alcohol or an acid having a pK value greater than about 3 to produce the desired 3-carbamoyloxymethyl cephalosporin derivative, in which, in the foregoing formulae, $R°$ is hydrogen or methoxy, $R_4$ is hydrogen and $R_5$ is $C_1$-$C_8$ alkanoyl;

azidoacetyl;

cyanoacetyl;

haloacetyl;

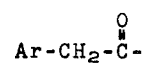

in which Ar is phenyl, thienyl, furyl, pyrrolyl, or phenyl substituted with from one to three substituents selected from the group consisting of fluorine, chlorine, bromine iodine, trifluoromethyl, hydroxy, $C_1$-$C_3$ alkyl, $C_1$-$C_3$ alkoxy, cyano, and nitro;

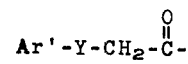

in which Ar' is phenyl, pyridyl, or substituted phenyl as defined above, and Y is oxygen or sulfur;

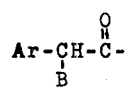

in which Ar is as defined above, and B is a hydroxyl or carboxyl group protected by esterification; —CN; —$N_3$; or —NHR in which R is benzyloxycarbonyl, $C_1$-$C_4$ alkoxycarbonyl, cycloalkoxycarbonyl, triphenylmethyl,

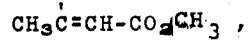

or 2,2,2-trichloroethoxycarbonyl;

(3-sydnone)$C_2$-$C_3$ alkanoyl;

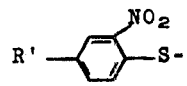

in which R' is hydrogen or methoxy;

2-(1H-tetrazol-1-yl)acetyl;

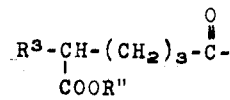

in which R'' is as herein defined, and $R^3$ is amino or an acylamido group in which the acyl group is $C_1$-$C_4$ alkanoyl, $C_6$-$C_{12}$ aroyl, $C_1$-$C_4$ alkoxycarbonyl, benzyloxycarbonyl, $C_5$-$C_6$ cycloalkoxycarbonyl, $C_6$-$C_{12}$ aryloxycarbonyl, phthaloyl, or one of the above groups substituted with from one to three groups each selected from the group consisting of $C_1$-$C_4$ alkyl, halo, nitro, $C_1$-$C_4$ alkoxy, cyano; or R$^4$ and R$^5$ taken together with the nitrogen to which they are bonded is phthalimido or a cyclic imide moiety of a $C_3$-$C_{12}$ dicarboxylic acid, and R'' is hydrogen, an amine salt cation of dicyclohexylamine, triethylamine, or tributylamine, or a carboxy protecting group selected from the group consisting of $C_1$-$C_6$ alkyl, 2,2,2-trihaloethyl, 2-iodoethyl, $C_5$-$C_7$ tert-alkenyl, $C_5$-$C_7$ tert-alkynyl, benzyl, nitrobenzyl, tetrahydropyranyl, succinimidomethyl, phthalimidomethyl, methoxybenzyl, dimethoxybenzyl, cyanomethyl, nitrophenyl, dinitrophenyl, 2,4,5-trinitrophenyl, bis(p-methoxyphenyl)methyl, triphenylmethyl, benzhydryl, benzyloxymethyl, $C_2$-$C_6$ alkanoyloxymethyl, $C_2$-$C_4$ alkanoyl, phenacyl, and a radical of the formula

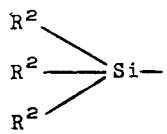

in which each R$^2$ independently is $C_1$-$C_4$ alkyl or halo selected from the group consisting of bromo, chloro, fluoro, and iodo, subject to the limitation that at least one R$^2$ is $C_1$-$C_4$ alkyl.

2. The process of claim 1, wherein a compound having the formula

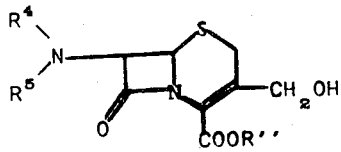

is converted to a compound of the formula

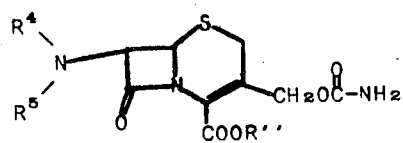

3. The process of claim 1, wherein a compound having the formula

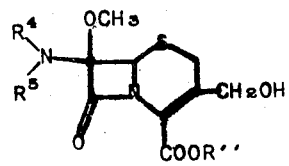

is converted to a compound of the formula

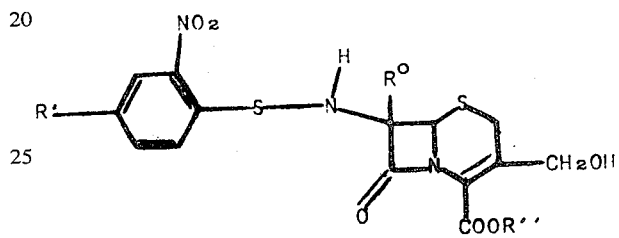

4. The process of claim 1, in which trichloroacetyl isocyanate is reacted with a 3-hydroxymethyl cephalosporin in the presence of an inert solvent and at a temperature of from about −10°C. to about +30°C.

5. The process of claim 4, in which the cleavage of the 3-(N-trichloroacetyl)carbamoyloxymethyl cephalosporin is carried out in the presence of sodium carbonate at a temperature of from about 0°C. to about 40°C.

6. The process of claim 1, wherein a compound having the formula

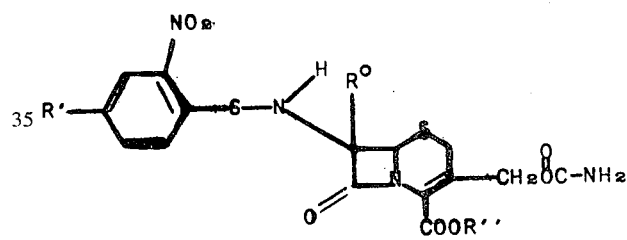

is converted to a compound having the formula

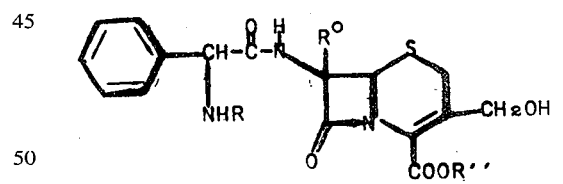

7. The process of claim 1, wherein a compound having the formula

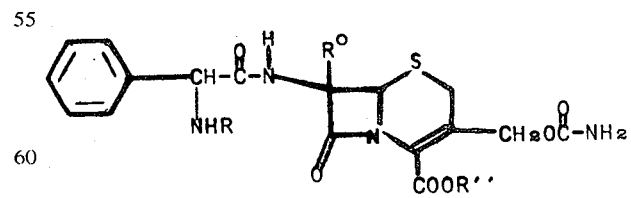

is converted to a compound having the formula

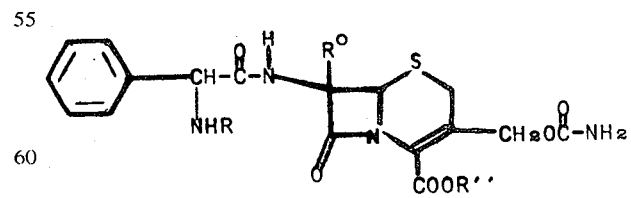

* * * * *